United States Patent Office 2,734,526
Patented Feb. 14, 1956

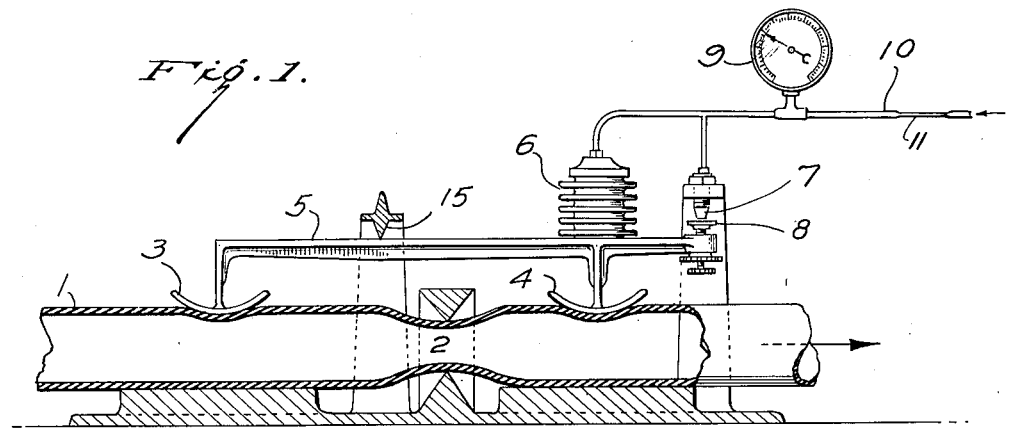
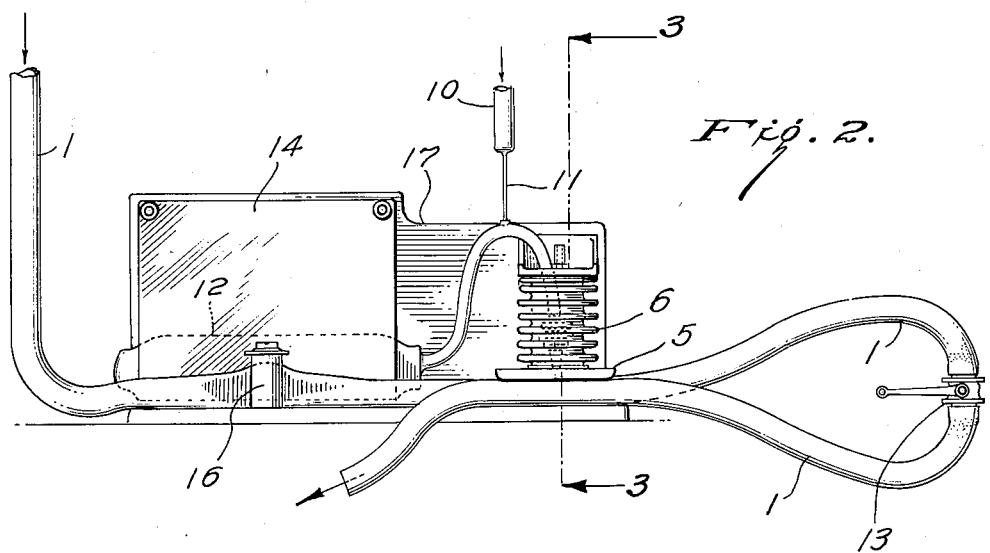
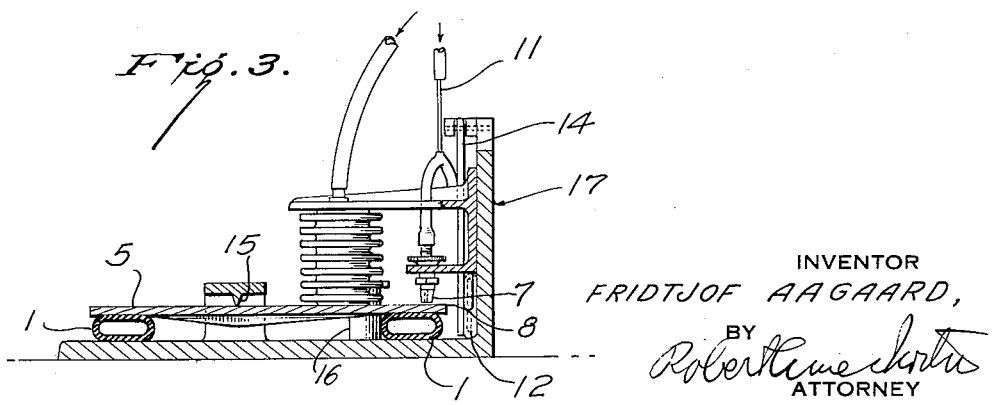

2,734,526

FLUID PRESSURE CONTROL

Fridtjof Aagaard, Rahway, N. J., assignor to American Cyanamid Company, New York, N. Y., a corporation of Maine Application September 16, 1950, Serial No. 185,315

2 Claims. (Cl. 137—486)

This invention relates to a device for measuring flow of fluids in a conduit without removing any fluid or inserting any movable parts therein and in a more particular aspect relates to a method of controlling fluid flow to a conduit to maintain it at a predetermined value.

Flow meters in the past have been of two general types. One type inserts a rotating or other moving element in the conduit through which the fluid is flowing. This type of meter requires that the whole flow of fluid pass through the meter and its moving parts must, therefore, be of suitable size and where the fluid is a corrosive liquid, moving parts must be renewed frequently or constructed of expensive non-corrosive material.

Another type of flow meter utilizes a restricted portion or orifice in the conduit from which the fluid flows with openings on either side of the orifice connected to pressure gauges, such as mercury manometers. This type meter again requires opening in the conduit and is subjected to conditions such as the clogging of the dead branches of the manometer and also is difficult to make extremely sensitive and at the same time rugged.

The present invention, while utilizing the principles of the second type of flow meter, that is to say restricted portion of the conduit through which a fluid is flowing, is not subjected to the disadvantages of this type of flow meter. Essentially, the conduit is a flexible, deformable tube with a restricted portion. The restriction does not, however, have to be very great because, as will be pointed out below, the pressure responsive elements used in the present invention are extremely sensitive. Essentially, these elements consist of two plates, which may be of curved shape slightly deforming the flexible tube on either side of the orifice. These plates are attached to a metal bar which is provided with a fulcrum so that the movement of the ends of the bar is a differential between the pressure in the conduit above and below the restriction. On one end of the bar there is mounted a suitable fluid pressure device such as bellows diaphragm and linkage connected to a source of compressed fluid, such as compressed air.

The same end is provided with a fluid pilot valve such as flapper and nozzle air valve. This type of pilot is extremely sensitive requiring movement in the range of a few thousandths of an inch. It is thus possible to measure with extreme accuracy small differential pressures above and below the restriction in the fluid conduit. As a result, only a slight restriction is necessary which avoids the serious clogging problems encountered when a small orifice is used in an orifice tube of flow meter.

While in its broader aspects the present invention includes flow meters of the above differential type, it does not find its field of maximum utility here because flow meters of other types can be constructed to handle most ordinary flow measurements. However, in a more specific aspect of the invention it is possible to use it to maintain a constant flow with extreme accuracy and without additional pressure controlling devices. In this preferred modification, the present invention performs two functions with the same element and makes it possible for the first time to maintain an absolutely accurate flow with fluids that are otherwise difficult to handle, for example fluids containing a considerable quantity of suspended solids. In this field, the invention presents its maximum utility. Essentially, control is effected by utilizing fluid pressure variations brought about by the variation of the fluid pilot to vary the constriction in the upstream side of the conduit, and, therefore vary the pressure on the upstream side of the control restriction or orifice. An extremely accurate control is thus made possible and it will operate with a high degree of reliability with a wide range of fluids, not only those which are fairly easy to handle, such as non-toxic, non-corrosive liquids, but also toxic and corrosive liquids and those which contain considerable contents of suspended solids.

A wide choice of flexible, deformable tubing material permits adaptation of the present invention to the flow control of almost any liquid. For most operations, the flow of liquid in the conduit is under small or moderate pressure and for such operation deformable tubing of satisfactory characteristics is available. Where extreme pressures are encountered the tubing may be inside a larger metal pipe or sleeve and the annular spaces between the sections of tubing and metal sleeve filled with a suitable pressure transmitting fluid which could be caused to actuate the differential bar which is used in the present invention.

The invention will be described in greater detail in conjunction with the drawings in which:

Fig. 1 is a vertical section through a flow meter;
Fig. 2 is a side elevation of a flow controller, and
Fig. 3 is a vertical section along the line 3—3 of Fig. 2.

The flow of liquid in the flow meter shown in Fig. 1 is through a flexible, deformable tube 1 which is provided with a restriction or orifice 2. On either side of the orifice the tube is slightly deformed by the curved plates 3 and 4 which are on the ends of a bar 5, capable of rocking on the knife edge fulcrum 15.

On one end of the bar 5 there is connected a bellows 6, one end of which is mounted in the main framework of the meter. This bellows is connected through the pipe 10 to a suitable source of compressed fluid, such as compressed air, the pressure being measured by the gauge 9. A branch pipe leads to nozzle 7 adjacent and adjustable to seat 8 in the end of the bar 5.

In normal operation for a predetermined flow there is a very slight pressure differential through the orifice 2 because the latter constitutes a relatively slight restriction. The seat 8 is adjusted so that for the predetermined flow it is very close but not quite touching the nozzle 7. A certain amount of air, therefore, leaks out through the nozzle 7 and the pressure on the bellows 6 as measured by the gauge 9, is just sufficient to keep the bar 5 in equilibrium.

If the flow increases the pressure drop through the restriction 2 also increases which will cause the plate 3 to move up slightly and the plate 4 to move down. This movement, however, will move the seat 8 away from the nozzle causing an increase in air flow therethrough and drop in pressure on the bellows side of capillary 11 which has registered by the gauge 9. In common with fluid pilot valves of the type shown the amount of movement is extremely slight, amounting to a few thousandths of an inch. Flow can, therefore, be measured very accurately without any direct communication with the fluid flowing in the conduit 1. One might say that the plates 3 and 4 felt the pulse of the liquid flowing through conduit 1. The measurement is, therefore, not effected by corrosion of moving parts and clogging is reduced to the minimum because the orifice or restriction 2 is so slight that solids pass through readily.

Figs. 2 and 3 illustrated the preferred modification of the present invention in which the flow metering also affects flow control. Since these figures employ many of the elements of Fig. 1, these elements will be given the same reference numerals. For convenience the conduit 1 is deformed into a loop with an adjustable restriction or orifice 13 in the broad end thereof. The two branches above and below the orifice pass parallel to each other between the main framework of the instrument and the bar 5 which rocks on the fulcrum 15 as is described in connection with Fig. 1. The pilot valve and bellows part in the same manner as in Fig. 1 but there is provided between the air pipe 10 and the bellows and pilot valve a capillary 11. In turn the pipe to the valve is connected to a large deformable tube 12 bearing against a movable plate 14 mounted in the framework 17 in the instrument. This plate compresses the upstream portion of the conduit against an arbor 16 as shown in Fig. 2.

In operation, the orifice 13 and the adjustment of the pilot valve is set so that there is a slight flow of air through the nozzle when the pressures in the upstream and downstream portions of the conduit 1 are created for the predetermined flow through the orifice 13. If this flow increases, the pressure drop through the orifice 13 increases and the end of the bar 5 bearing on the downstream section of the conduit moves down slightly, thus causes a rapidly decreased flow of air through the nozzle 7 which in turn decreases pressure drop through the capillary 11. The higher pressure in tube 12 causes it to expand moving the plate 14 and pressing the upstream side of the conduit 1 against the arbor 16. This decreases the upstream pressure at orifice 13 and reduces flow until the predetermined flow conditions are restored. Decreased flow produces the opposite result causing the seat 8 to move away from the nozzle 7 increasing the pressure drop in the capillary 11 and relaxing the tube 12, which then increases the upstream pressure at orifice 13 until the desired flow is once again restored.

I claim:
1. A device for controlling the rate of flow of a fluid comprising in combination a conduit for said fluid provided with an orifice on either side of which is a section of resilient deformable tubing; an element contacting the resilient deformable tubing on either side of said orifice a flapper nozzle gas valve operatively connected to said element and movable to actuate said gas valve in response to differential pressure across said orifice; a separate source of gas pressure leading to said gas valve; said flapper nozzle valve producing changes in the gas pressure, and means responsive to said changing gas pressure for deforming said tubing to control said rate of flow.

2. A device according to claim 1 in which the position of the nozzle with respect to the flapper may be adjusted to select the rate of flow to be maintained.

References Cited in the file of this patent

UNITED STATES PATENTS

| | | |
|---|---|---|
| 1,745,059 | Rush | Jan. 28, 1930 |
| 1,904,475 | Kissing | Apr. 18, 1933 |
| 2,223,712 | Ziebolz | Dec. 3, 1940 |
| 2,258,758 | Haultain | Oct. 14, 1941 |
| 2,268,549 | Kennedy | Jan. 6, 1942 |
| 2,314,152 | Mallory | Mar. 16, 1943 |
| 2,399,938 | Pett | May 7, 1946 |
| 2,408,685 | Rosenberger | Oct. 1, 1946 |
| 2,517,820 | Aagaard | Aug. 8, 1950 |
| 2,588,212 | Custer | Mar. 4, 1952 |